US009251024B2

(12) United States Patent
Kiffmeier et al.

(10) Patent No.: US 9,251,024 B2
(45) Date of Patent: Feb. 2, 2016

(54) METHOD FOR MANIPULATING A MEMORY OPERATION OF A CONTROL UNIT PROGRAM ON A VIRTUAL OR REAL MEMORY

(71) Applicant: dSPACE digital signal processing and control engineering GmbH, Paderborn (DE)

(72) Inventors: Ulrich Kiffmeier, Harsewinkel (DE); Tobias Sielhorst, Verl (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 131 days.

(21) Appl. No.: 14/167,154

(22) Filed: Jan. 29, 2014

(65) Prior Publication Data

US 2014/0215270 A1   Jul. 31, 2014

Related U.S. Application Data

(60) Provisional application No. 61/758,061, filed on Jan. 29, 2013.

(30) Foreign Application Priority Data

Jan. 29, 2013   (EP) ..................... 13152993

(51) Int. Cl.
*G06F 11/00*   (2006.01)
*G06F 11/263*   (2006.01)
(Continued)

(52) U.S. Cl.
CPC .......... *G06F 11/263* (2013.01); *G06F 11/3466* (2013.01); *G06F 11/3476* (2013.01); *G06F 11/3624* (2013.01)

(58) Field of Classification Search
CPC ............ G06F 11/3466; G06F 11/3476; G06F 11/3624
See application file for complete search history.

(56) References Cited

U.S. PATENT DOCUMENTS 5,581,696 A  * 12/1996  Kolawa et al. ............... 714/38.1
5,600,596 A  *  2/1997  Shirakihara .............. 365/189.16
7,593,791 B2    9/2009  Watzl
(Continued)

FOREIGN PATENT DOCUMENTS

WO   WO 2005/045538 A1   5/2005

OTHER PUBLICATIONS

Oyama et al., "A Hypervisor for Injecting Scenario-Based Attack Effects," 35th IEEE Computer Software & Application Conf., pp. 682-687 (Jul. 18, 2011).
(Continued)

*Primary Examiner* — Charles Ehne
(74) *Attorney, Agent, or Firm* — Muncy, Geissler, Olds & Lowe, P.C.

(57) ABSTRACT

A method for manipulating a memory operation of a control unit program on a memory of a virtual or real electronic control unit (ECU), such as is used in vehicles, for example. The manipulation of the memory operation is accomplished by a memory manipulation program component, via which a set of manipulation functions is provided, from which at least one manipulation function is selected, so that this function, by activating the memory manipulation program component, changes a memory access initiated by the control unit program in accordance with the selected manipulation function during execution of the control unit program.

15 Claims, 2 Drawing Sheets

(51) Int. Cl.
    *G06F 11/36*    (2006.01)
    *G06F 11/34*    (2006.01)

(56) References Cited

U.S. PATENT DOCUMENTS

2004/0230763 A1\* 11/2004 Cohen et al. .................. 711/170
2009/0049339 A1    2/2009 Cases et al.

OTHER PUBLICATIONS

Skarin et al., "GOOFI-2: A Tool for Experimental Dependability Assessment," IEEE/IFIP Int'l Conf. on Dependable Systems & Networks, pp. 557-562 (Jun. 28, 2010).
European Search Report for European Application No. 13152993.5 dated Jul. 11, 2013 with English translation.

\* cited by examiner

METHOD FOR MANIPULATING A MEMORY OPERATION OF A CONTROL UNIT PROGRAM ON A VIRTUAL OR REAL MEMORY

This nonprovisional application claims priority to European Patent Application No. 13152993.5, which was filed on Jan. 29, 2013, and to U.S. Provisional Application No. 61/758,061, which was filed on Jan. 29, 2013, and which are both herein incorporated by reference.

BACKGROUND OF THE INVENTION

1. Field of the Invention

The present invention relates to a method for manipulating a memory operation of a control unit program on a memory of a virtual or real electronic control unit (ECU), such as is used in motor vehicles, for example.

2. Description of the Background Art

Memory errors are not uncommon in control units, and can have fatal consequences depending on the safety level. The causes of memory errors are manifold:

EEPROM and flash memory for storing nonvolatile data have a limited number of write cycles. Usually, therefore, it is necessary to manage multiple redundant memory blocks with check sums. Writing to EEPROM or flash memory blocks takes a relatively long amount of time. Additional errors can arise during processing of a memory job that extends over multiple cycles.

Address lines and data lines from external memory components can be faulty.

Interference due to electromagnetic fields (EMC) or ionizing radiation can result in sporadic errors.

Temperature problems and general aging processes.

A simple examination shows that these problems cannot be neglected in safety-critical control units: If a control unit is installed in 1 million vehicles and has approximately 5,000 operating hours, then a task with a cycle time of 1 ms is executed a total of approximately $1.8*10^{16}$ times. During this time, it is guaranteed that almost every possible hardware and software error will occur.

Thus, precautions must be taken in the hardware and software design of control units to detect and intercept such memory errors. These precautions must be tested for release of a safety-critical control unit. However, such tests have proven to be very difficult and resource-intensive, since errors can only be induced with special hardware or elaborate hardware emulators.

The use of nonvolatile memory (NVRAM), in particular, has effects on the application software of an ECU as well. In similar fashion to bus errors, error conditions during reading and writing of the nonvolatile memory must be intercepted and handled. Another reason this is difficult is that read/write operations can extend over multiple cycles.

"Fault Injection Tests" are recommended in ISO standard 26262 at all levels, and indeed are required for the higher safety level (ASIL-D).

The approaches to testing of memory errors used heretofore for these purposes are based on hardware-specific prototypes or hardware emulators, which are very resource-intensive, and oftentimes have difficulty exactly reproducing error conditions that are generated.

SUMMARY OF THE INVENTION

It is therefore an object of the present invention to provide an efficient method for simulating and testing memory errors that can be employed flexibly throughout the entire development process.

This object is attained in an embodiment by a method for manipulating a first memory operation that is carried out through a control unit program of a virtual or real electronic control unit in a vehicle, wherein manipulating the memory operation is accomplished by a memory manipulation program component, and wherein the method comprises the following steps: providing a set of manipulation functions, selecting at least one manipulation function, and/or activating the memory manipulation program component, which changes a memory access initiated by the control unit program in accordance with the selected manipulation function during execution of the control unit program.

The term "control unit program" can be understood within the scope of the present invention as a measurement, control, regulating, and/or calibration program for controlling an electronic control unit in a vehicle. The term "control unit program" can cover individual program components with different functions as well as complex program architectures with multiple, interconnected program components. Within the scope of the present invention, the term "electronic control unit" can be understood as a control system, for example a control device in a motor vehicle. In this context, the electronic control unit can be used for measuring, controlling, regulating, and/or calibrating vehicle components. The term "vehicle" is used below as an inclusive designation for watercraft, land vehicles, aircraft, spacecraft, and/or combinations thereof.

An embodiment of the invention is based on the finding that, with the complexity of modern control units, early testing of the reaction of a control unit program to possible hardware errors with regard to a memory operation permits more efficient development of the corresponding control unit than when it is necessary for appropriate testing to wait until initial prototypes are completed.

A significant advantage of the invention resides in the fact that the invention is suitable for testing memory errors in offline simulations. Consequently, the reaction of the control unit program can be tested early, even before a hardware prototype exists. Because of the virtual time base, the full simulation of the control unit, including its environment models, can be arbitrarily slowed or stopped and resumed without changing the simulated behavior. Errors in the control unit program's behavior can be localized much more simply using a diagnostic program during an offline simulation than in a real-time simulation. In a deterministic simulation, the errors are reproducible and their effects can thus be analyzed better. Even random numbers can be reproducibly generated and used by storing the initial value of the number generator.

According to an embodiment of the present invention, the manipulation function can manipulate a data block to be written by the means that data values to be written are replaced by other, predetermined data values.

In order to test the reaction of the control unit program to write errors during memory access as well, a data block to be written can be replaced by a predetermined data block. The predetermined data block can be specified by a defined test scenario.

According to another embodiment of the present invention, the manipulation function can manipulate a data block to be read in that data values that have been read are replaced by other, predetermined data values.

A reaction of the control unit program to a potential read error during memory access can be tested. In this design, a read command issued by the control unit program is executed and the manipulation function changes the data block read out of the memory.

According to another embodiment of the present invention, the manipulation function can overwrite a return value of a memory operation.

According to another embodiment of the present invention, the manipulation function can manipulate a status of a memory abstraction interface program component and/or overwrites the status of connected memory abstraction program components.

A memory abstraction program component can refer to special program components of a control unit that take into account the specific hardware characteristics of EEPROM and flash memories—such as slow read/write access, limited number of write cycles, and use of redundant blocks—in that they encapsulate the memory access and flash memory and abstract it from the outside.

When a memory operation is being carried out by the control unit program, in addition to the data to be written or to be read, a status variable of a memory abstraction interface program component or of a memory abstraction program component is set that among other things indicates whether the drivers required for a memory operation have already been initialized, whether the memory modules in question are idle at the moment, or whether they are currently in use. In this embodiment, this status variable is overwritten by the manipulation function.

According to another embodiment of the present invention, the first memory operation can be executed within the framework of a first job and at least a second memory operation is executed within the framework of a second job, wherein the processing of the jobs takes place asynchronously and the manipulation function manipulates a processing of the asynchronous jobs by the means that it aborts or delays the jobs and/or corrupts a job result.

A job can be understood as, for example, a task to carry out a memory operation, wherein the job can be fulfilled without the intervention of another component. A memory access operation can require a relatively long time, for which reason the memory management contains a task for the operation, which is referred to as a job. The memory management executes the task asynchronously, and gives a response to the requester when the job has been completed. "Asynchronous" execution is present when the calling program component initiates a memory job before next performing other tasks while the memory job runs more or less in parallel. Later, the calling program component can have the memory service inform it as to whether the job was successful, or the calling program component actively queries the result of the job (polling).

According to another embodiment of the present invention, the manipulation function marks memory blocks as invalid.

The marking of a memory block as invalid indicates that the memory operation either cannot be executed or provides invalid data. In this way, it is possible to test how the control unit program behaves when a data block that was requested for a memory operation is not available, or, in the case of a read access, the data of the data block cannot be read.

Each of the preceding embodiments of the present invention can be further developed in such a manner that execution of the manipulation function takes place a single time at an absolute or relative point in time.

In an embodiment, the manipulation of a memory operation that was initiated by the control unit program can take place a single time. The execution takes place at an absolute or relative point in time, for example x seconds after the control unit program is started.

Alternatively or in combination, the preceding embodiments can be further developed by the means that the execution of the manipulation function can occur periodically over a run time determined in a test scenario.

Alternatively or in combination, the preceding embodiments can be further developed by the means that the execution of the manipulation function can occur sporadically over a run time determined in a test scenario.

Alternatively or in combination, the preceding embodiments can be further developed by the means that the execution of the manipulation function can occur with a predetermined probability distribution.

In order to simulate randomly occurring memory errors in addition to targeted memory operations, the manipulation can be called in accordance with a certain probability distribution. As a result of storing the initial values for the random number generators used, these error simulations are reproducible as well.

Alternatively or in combination, the preceding embodiments can be further developed by the means that the execution of the manipulation function can be dependent upon a predetermined event.

Making execution of the manipulation function dependent on a certain event allows the targeted manipulation of a memory operation, for example if the program component x initiates a memory access, then execute the manipulation function.

Each of the preceding embodiments of the present invention can be designed such that the memory manipulation program component can constitute an independent program component and can be connectable by defined interfaces to a memory abstraction interface program component and memory abstraction program components and/or memory emulation program components.

Alternatively, each of the preceding embodiments can be designed such that the memory manipulation program component can constitute a part of a memory abstraction interface program component or a memory abstraction program component and/or memory emulation program component.

In another alternative embodiment, the memory manipulation program component has direct access to a memory bank of an electronic control unit component.

Each of the preceding embodiments of the present invention can be designed such that control of the memory manipulation program component can be carried out through code generation prior to compilation of the control unit program.

As a result of code generation of the memory manipulation program component prior to compilation of the control unit program, the method is very efficient with regard to run time. This is especially advantageous when the code of the memory manipulation program component contains only a few configuration parameters that can be adjusted with a calibration service (such as XCP/A2L) that is present in any case. In this case, there is no need for a separate service for the memory manipulation program component, which is to say that the run time and the RAM memory use are minimized.

Alternatively, each of the preceding embodiments can be designed such that control of the memory manipulation program component can be carried out through a service that is defined by the control unit program and that receives commands from an operator control program.

In this embodiment of the present invention, control of the memory manipulation program component can be carried out through a service provided by the runtime environment that permits configuration of the memory manipulation program component at run time through defined service interfaces of the runtime environment.

Alternatively, each of the preceding embodiments can be designed such that control of the memory manipulation program component can be carried out through calibration variables of the control unit program that can be read and written by an experimental program.

In an embodiment, as part of the control unit program, calibration variables can be defined that use a calibration service present as a standard component in the control unit in order to control the memory manipulation program component. An advantage is that no separate service is required.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
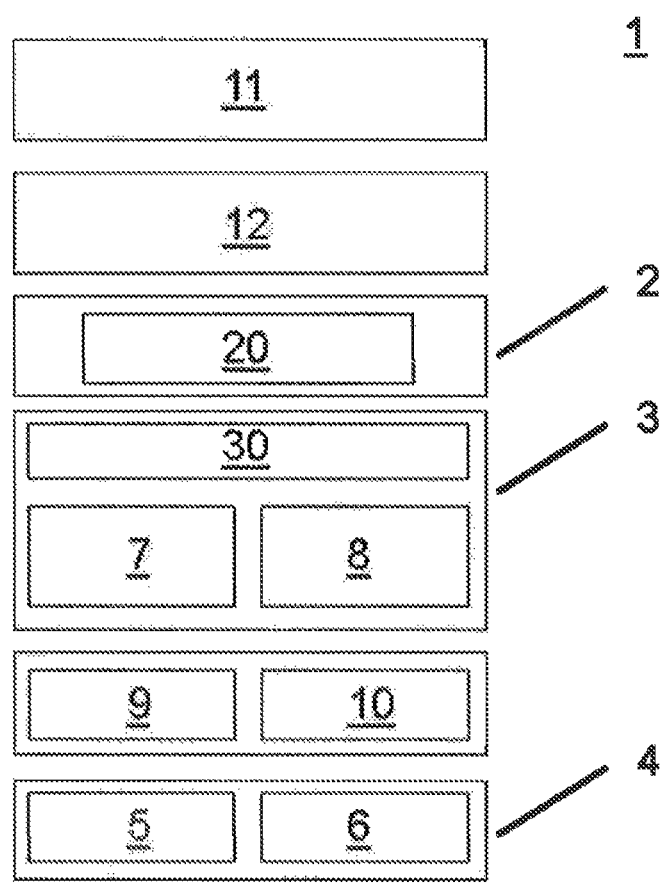
FIG. 1 illustrates a program architecture pursuant to the AUTOSAR Standard, Version 4.0.3.

FIG. 1 shows, by way of example, the structure of a program architecture 1 pursuant to the AUTOSAR Standard, Version 4.0.3. However, similar architectures are also found on non-AUTOSAR control units, so the invention can also be applied accordingly on non-AUTOSAR ECUs. The highest level is composed of the application program 11, which constitutes the control unit program within the scope of the patent application. Located below it is the runtime environment 12, which can access the underlying levels through defined interfaces.

Because of the specific hardware characteristics of EEPROM and flash memories, such as slow read/write access, a limited number of write cycles, and use of redundant blocks, a control unit generally has special program modules 2, so-called memory services, that encapsulate the access to the EEPROM and flash memory and abstract it from the outside.

Nonvolatile data are managed in the AUTOSAR program architecture by means of the memory manager 20, which is part of the memory services. Through the memory hardware abstraction layer 3, the memory manager accesses the drivers 9, 10 for the different memory types 5, 6 that encapsulate communication with the external memory component. If an external EEPROM memory is connected through a serial peripheral interface, the SPI driver is also involved.

Below the memory abstraction program interface 30, the memory access branches as a function of the memory type— EEPROM 5 or flash 6—with the API functions defined in Table 1 being called. Similar APIs exist for the modules 7 and 8 below it.

TABLE 1

APIs of the AUTOSAR memory abstraction module

| API Function | Description |
| --- | --- |
| void MemIf_SetMode(..) | Sets the mode of the underlying memory abstraction modules. |
| Std_ReturnType MemIf_Read(..) | Reads a block into a buffer. |
| Std_ReturnType MemIf_Write(..) | Writes the contents of a buffer into a block. |
| void MemIf_Cancel(..) | Cancels the ongoing asynchronous operation. |
| MemIf_StatusType MemIf_GetStatus(..) | Returns the status of the underlying memory abstraction module. |
| MemIf_JobResultType MemIf_GetJobResult(..) | Returns the result of an asynchronous job. |
| Std_ReturnType MemIf_InvalidateBlock(..) | Invalidates a block. |
| void MemIf_GetVersionInfo(..) | Returns the version info of the MemIf module. |
| Std_ReturnType MemIf_EraseImmediateBlock(..) | Erases a block. |

The APIs of the EEPROM abstraction module 7 and of the flash EEPROM emulation module 8 have various status and error conditions that are returned to the memory manager 20 through the memory abstraction module 3. Table 2 shows possible error codes of the memory abstraction module 3. The same values exist for the modules 7 and 8 below it.

TABLE 2

Status values of the memory abstraction module.

| Name: | MemIf_StatusType | |
| --- | --- | --- |
| Type: | Enumeration | |
| Range: | MEMIF_UNINIT | The underlying abstraction module or device driver has not been initialized (yet). |
| | MEMIF_IDLE | The underlying abstraction module or device driver is currently idle. |
| | MEMIF_BUSY | The underlying abstraction module or device driver is currently busy. |
| | MEMIF_BUSY_INTERNAL | The underlying abstraction module is busy with internal management operations. The underlying device driver can be busy or idle. |
| Description: | Denotes the current status of the underlying abstraction module and device drive. | |

TABLE 3

Error codes of the memory abstraction module.

| Name: | MemIf_JobResultType | |
| --- | --- | --- |
| Type: | Enumeration | |
| Range: | MEMIF_JOB_OK | The job has been finished successfully. |
| | MEMIF_JOB_FAILED | The job has not been finished successfully. |
| | MEMIF_JOB_PENDING | The job has not yet been finished. |
| | MEMIF_JOB_CANCELED | The job has been canceled. |
| | MEMIF_BLOCK_INCONSISTENT | The requested block is inconsistent, it may contain corrupted data. |
| | MEMIF_BLOCK_INVALID | The requested block has been marked as invalid, the requested operation can not be performed. |

TABLE 3-continued

Error codes of the memory abstraction module.

Figure 2:
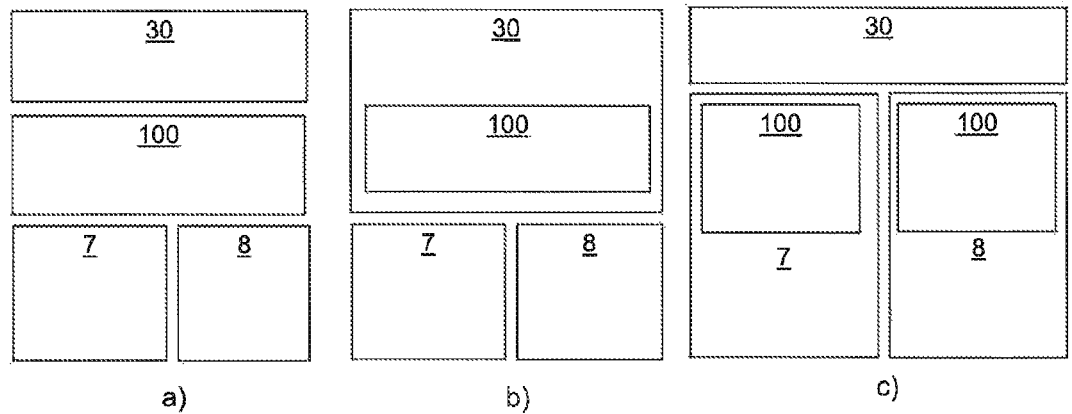
FIG. 2 illustrates a memory manager.

De-    Denotes the result of the last job.
scrip-
tion:

In order to be able to test the reaction of the control unit program to each of the status values and error codes, it is possible to undertake a targeted manipulation of one or more values. This is accomplished through the memory manipulation program component 100, which undertakes a specific manipulation 110 of the memory access using a selected manipulation function. In this context, the memory manipulation program component can be tied to various locations in the program architecture:

Between the memory abstraction module 3 and the EEPROM abstraction module 7 or the flash EEPROM emulation module 8 (FIG. 2(*a*))

As a component of the memory abstraction module 3 (FIG. 2(*b*))

As a component of both the EEPROM abstraction module 7 and the flash EEPROM emulation module 8 (FIG. 2(*a*))

Figure 3:
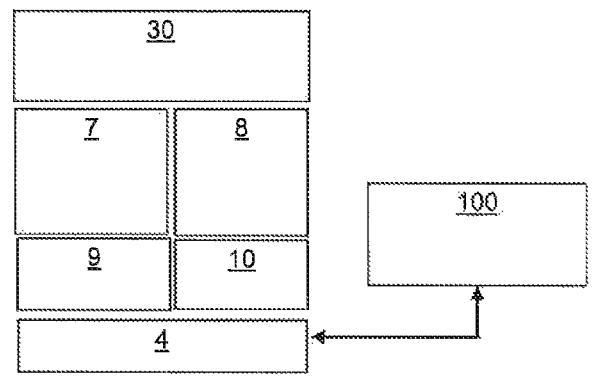
FIG. 3 illustrates a direct manipulation of the memory in an offline simulation.

In an offline simulation, the individual memory areas are allocated by the simulator. For this reason, the memory areas can also be changed directly during a simulation in order to stimulate memory access errors (FIG. 3).

The memory manipulation program component is only active when a corresponding option is set, otherwise its behavior is entirely transparent and the control unit program will run as if the memory manipulation program component were not present.

The memory manipulation program component can be activated at run time of a simulation, and can undertake the following manipulations independently of the manipulation function selected:

Manipulation of a block to be written, i.e. replacement of the written values by other values that are predefined by a test scenario Manipulation of a block, to be read, i.e. replacement of the values that have been read by other values that are predefined by a test scenario Manipulation of the return value of the operation Manipulation of the status of the memory abstraction module 3 and the modules 7 and 8 below it Manipulation of the processing of asynchronous jobs, e.g. aborting or delaying the job, corrupting the job result Marking memory blocks as invalid.

To this end, the memory manipulation program component 100 offers predefined manipulation functions 110, which are called in specific contexts. However, the user can also register manipulation functions 110 that he defines himself.

The parameters of the manipulation functions can be configured in advance, or they are set at run time through an API.

The manipulation options described can be activated in various ways:

One-time activation of a manipulation at an absolute or relative point in time,

Periodic activation of a manipulation,

Sporadic activation of a manipulation,

Activation of a manipulation with a predetermined probability distribution,

Activation of a manipulation as a function of an event, e.g., X seconds after a certain job was started.

Figure 4:
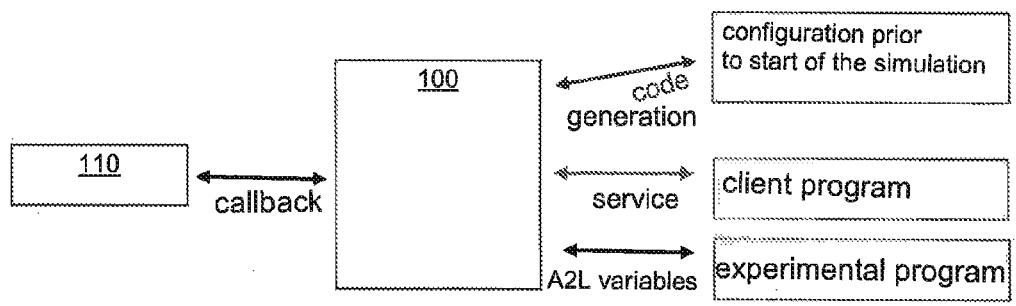
FIG. 4 illustrates a configuration and control of the memory manipulation unit.

Consequently, several possibilities exist for configuration and control of the memory manipulation program component 100, which are shown in FIG. 4.

Thus, control of the memory manipulation program component can be carried out through code generation prior to compilation of the control unit program, so that the method is very efficient with regard to run time.

Control of the memory manipulation program component can alternatively be carried out through a service provided by the runtime environment that permits configuration of the memory manipulation program component at run time through defined service interfaces of the runtime environment.

In addition, the control can be defined as part of the control unit program through calibration variables. In this context, calibration variables are present as a standard component in the control unit so that the calibration service that is present in any case can be accessed.

The above detailed description is illustrative in nature, and should not be understood to be restrictive. A person skilled in the art will derive possible variations and combinations of the described embodiments from the description. The scope of protection thus should not be limited on the basis of the description, but rather should be determined on the basis of the claims alone.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manipulating a first memory operation that is carried out through a control unit program of a virtual or real electronic control unit, wherein manipulating the memory operation is accomplished by a memory manipulation program component, the method comprising:
    providing a set of manipulation functions;
    selecting at least one manipulation function; and
    activating the memory manipulation program component, which changes a memory access initiated by the control unit program in accordance with the selected manipulation function during execution of the control unit program,
    wherein execution of the manipulation function occurs periodically over a run time determined in a test scenario, and/or wherein execution of the manipulation function occurs sporadically over a run time determined in a test scenario, and/or wherein execution of the manipulation function occurs with a predetermined probability distribution, and/or wherein execution of the manipulation function occurs as a function of a predetermined event.

2. The method according to claim 1, wherein the manipulation function manipulates a data block to be written in that data values to be written are replaced by other, predetermined data values.

3. The method according to claim 1, wherein the manipulation function manipulates a data block to be read in that data values that have been read are replaced by other, predetermined data values.

4. The method according to claim 1, wherein the manipulation function overwrites a return value of a memory operation.

5. The method according to claim 1, wherein the manipulation function manipulates a status of a memory abstraction interface program component and/or of connected memory abstraction program components.

6. The method according to claim 1, wherein the manipulation function marks memory blocks as invalid.

7. The method according to claim 1, wherein the memory manipulation program component is an independent program component and is connected by defined interfaces to a memory abstraction interface program component and memory abstraction program components and/or memory emulation program component.

8. The method according to claim 1, wherein the memory manipulation program component is a part of a memory abstraction interface program component or a memory abstraction program component and/or memory emulation program component.

9. The method according to claim 1, wherein the memory manipulation program component has direct access to a memory bank of an electronic control unit component.

10. The method according to claim 1, wherein control of the memory manipulation program component is carried out through code generation prior to a compilation of the control unit program.

11. The method according to claim 1, wherein control of the memory manipulation program component is carried out through a service that is defined by the control unit program and that receives commands from an operator control program.

12. A method for manipulating a first memory operation that is carried out through a control unit program of a virtual or real electronic control unit, wherein manipulating the memory operation is accomplished by a memory manipulation program component, the method comprising:
   providing a set of manipulation functions;
   selecting at least one manipulation function; and
   activating the memory manipulation program component, which changes a memory access initiated by the control unit program in accordance with the selected manipulation function during execution of the control unit program,
   wherein the first memory operation is executed within the framework of a first job and at least a second memory operation is executed within the framework of a second job, wherein the processing of the jobs takes place asynchronously, and wherein the manipulation function manipulates a processing of the asynchronous jobs by aborting or delaying the jobs and/or manipulating a job result.

13. The method according to claim 12, wherein execution of the manipulation function takes place a single time at an absolute or relative point in time.

14. A method for manipulating a first memory operation that is carried out through a control unit program of a virtual or real electronic control unit, wherein manipulating the memory operation is accomplished by a memory manipulation program component, the method comprising:
   providing a set of manipulation functions;
   selecting at least one manipulation function; and
   activating the memory manipulation program component, which changes a memory access initiated by the control unit program in accordance with the selected manipulation function during execution of the control unit program,
   wherein control of the memory manipulation program component is carried out through calibration variables of the control unit program that are configured to be read and written by an experimental program.

15. A method for manipulating a first memory operation that is carried out through a control unit program of a virtual or real electronic control unit, wherein manipulating the memory operation is accomplished by a memory manipulation program component, the method comprising:
   providing a set of manipulation functions;
   selecting at least one manipulation function; and
   activating the memory manipulation program component, which changes a memory access initiated by the control unit program in accordance with the selected manipulation function during execution of the control unit program,
   wherein:
      the memory manipulation program component is an independent program component and is connected by defined interfaces to a memory abstraction interface program component and memory abstraction program components and/or memory emulation program component, or
      the memory manipulation program component is a part of a memory abstraction interface program component or a memory abstraction program component and/or memory emulation program component, and
   wherein the memory access is carried out on a non-volatile memory and encapsulated by the memory abstraction interface program component and/or memory abstraction program component.

* * * * *